No. 742,322. PATENTED OCT. 27, 1903.
H. S. HOPKINS.
DRY CONDENSED MILK AND PROCESS OF MAKING SAME.
APPLICATION FILED OCT. 24, 1902.
NO MODEL.

Witnesses:
Robert Everett
E. M. Sweeney

Inventor:
Henry S. Hopkins
by Henry Calver
Atty

No. 742,322.

Patented October 27, 1903.

UNITED STATES PATENT OFFICE.

HENRY S. HOPKINS, OF BAINBRIDGE, NEW YORK, ASSIGNOR TO CASEIN COMPANY OF AMERICA, A CORPORATION OF NEW JERSEY.

DRY CONDENSED MILK AND PROCESS OF MAKING SAME.

SPECIFICATION forming part of Letters Patent No. 742,322, dated October 27, 1903.

Application filed October 24, 1902. Serial No. 128,582. (No specimens.)

*To all whom it may concern:*

Be it known that I, HENRY S. HOPKINS, a citizen of the United States, residing at Bainbridge, in the county of Chenango and State of New York, have invented certain new and useful Improvements in Milk-Powder or Dry Condensed Milk and Processes for Producing Same, of which the following is a specification, reference being had therein to the accompanying drawings.

The milk-powders or articles of dry condensed milk heretofore generally in use or on the market have been made from skimmed milk, for the reason that if whole or unskimmed milk be evaporated to form an article of desiccated milk the butter-fat therein is likely to become rancid in a short time, so that such whole or unskimmed milk-powder quickly deteriorates.

My invention or discovery has for its object to provide a milk-powder which will have all the essential solid elements of whole or unskimmed milk, but which will be of such a character that it will keep for a long time without deteriorating or becoming rancid or developing an objectionable odor, thus making it possible to transport the same in ordinary packages for great distances without exercising any special precaution to preserve it and so that it will not be necessary to retain it in cold storage or to seal it in air-tight packages, as it will keep for a reasonable length of time without such precautions.

Figure 1:
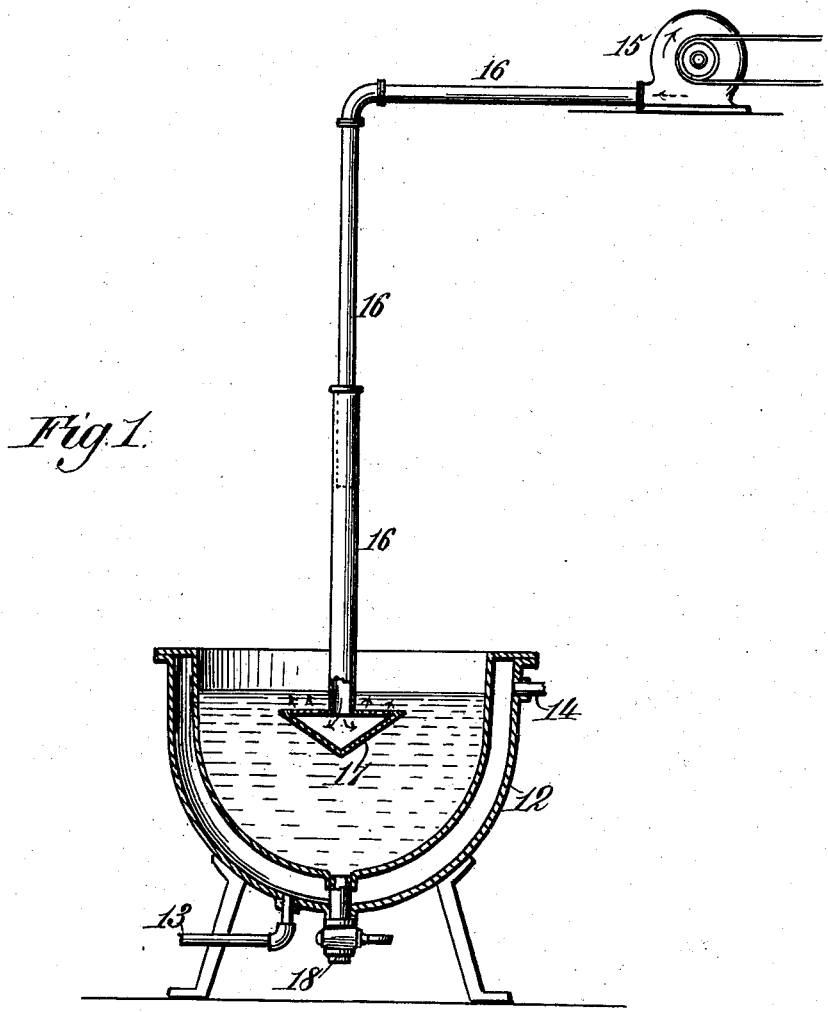
Figure 2:
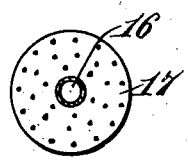

In the accompanying drawings, Figure 1 is a sectional elevation of an apparatus by means of which a part of my process is carried into effect, and Fig. 2 is a detail plan view of the delivery nozzle or head of the aerating-pipe.

In the manufacture of my improved milk-powder the butter-fat of the milk is extracted in any suitable manner, and the skimmed milk, or milk with the butter-fat removed, is then evaporated and reduced to a powder by any of the usual processes now in use. To the milk-powder thus produced from skimmed milk is then added a suitable proportion of butter-fat which has been prepared in the following manner: Any good article of butter, preferably sweet-cream butter, either salted or not and with or without the coloring-matter usually added to butter, is melted, preferably in an open-jacket kettle, and is heated to a relatively high temperature, preferably from about 150° to 220° Fahrenheit, and is kept heated for a period of, preferably, from about three to five hours, and, preferably, during the time when it is thus kept heated a blast of air, which may be cold or at ordinary atmospheric temperatures, is passed into or through the mass, thereby carrying off a considerable percentage of the moisture and volatile oils. During this heating and aerating process of the melted butter the greater portion of the foreign substances or impurities which all butter contains and comprising water, casein, &c., separate readily to the bottom of the kettle and are drawn off and discarded after the heating and aerating process has terminated. A small percentage of the casein which is contained in the butter will float to the surface of the melted butter and can be readily removed by skimming. The purified melted butter-fat which has been treated by the process just described is then added directly to the previously-made skimmed-milk powder and is thoroughly incorporated therewith by the use of any suitable mixer or mixing apparatus.

An apparatus by which the butter-fat-purifying process above described may be carried into effect is illustrated in the accompanying drawings, which show a jacket-kettle 12, provided with inlet and outlet pipes 13 14, which enable a circulation of steam or hot water to be maintained in the chamber of the kettle containing the melted butter-fat. A blast of air from a blower 15 passes through a pipe 16 to a nozzle or head 17, the entire part or the upper portion only of which may be perforated to permit of the escape of the air into the heated contents of the kettle, said nozzle or head being preferably adjusted so that its upper part is two or three inches below the surface of the heated contents of the kettle, and to provide for vertical adjustment of the nozzle or head the pipe 16 will preferably comprise telescoping parts, as shown in the drawings. The jacket-kettle will preferably be provided with a discharge-pipe 18, through which the contents of the kettle may be withdrawn after the purifying operation.

The purified butter-fat will be added to the previously-made skimmed-milk powder, preferably in a proportion about twenty-five per cent. of the mixed product, which will give an equivalent of something less than three per cent. of butter-fat in a solution in which sufficient water has been added to the thus-prepared powder to reduce it to the quality of normal whole milk. The exact percentage of purified butter-fat which is to be added to the skimmed-milk powder may, however, be varied as may be desired, according to the degree of richness which is to be given to the whole-milk powder produced by the addition of the purified butter-fat.

The invention or discovery is not to be understood as being limited to the particular temperatures hereinbefore stated or the particular duration of time mentioned in the purifying and aerating treatment of the melted butter to be incorporated in the whole-milk powder or to any particular percentage of purified butter-fat in the milk-powder, as variations within reasonable limits of these features may be made without departing from the essence of the invention or discovery.

Having thus described my invention or discovery, I claim and desire to secure by Letters Patent—

1. The herein-described milk-powder, consisting of desiccated skimmed milk and purified butter-fat thoroughly mixed together in substantially the proportions specified.

2. The herein-described process for producing milk-powder, consisting in separating the butter-fat from fresh milk, reducing the milk from which the butter-fat has been separated to a dry or powdered state, purifying butter-fat by separating casein and other foreign substances therefrom, and then thoroughly mixing a suitable proportion of the purified butter-fat with the previously-prepared milk-powder.

3. The herein-described process for producing milk-powder, consisting in separating the butter-fat from fresh milk, reducing the milk from which the butter-fat has been skimmed or eliminated to a powder, purifying the butter-fat by subjecting melted butter to a relatively high temperature for a considerable length of time, and then thoroughly incorporating a suitable percentage of the purified butter-fat with the skimmed-milk powder.

4. The herein-described process for producing milk-powder, consisting in separating the butter-fat from fresh milk, reducing the milk from which the butter-fat has been skimmed or eliminated to a powder, purifying the butter-fat by subjecting melted butter to a relatively high temerature and aeration for a considerable length of time, and then thoroughly incorporating a suitable percentage of the purified butter-fat with the skimmed-milk powder.

In testimony whereof I affix my signature in presence of two witnesses.

HENRY S. HOPKINS.

Witnesses:
CHARLES F. CLARK,
RALPH W. KIRBY.